(12) United States Patent
Dikshit et al.

(10) Patent No.: US 12,132,588 B2
(45) Date of Patent: Oct. 29, 2024

(54) LOOP DETECTION IN VIRTUAL EXTENSIBLE LOCAL AREA NETWORK OVERLAY

(71) Applicant: HEWLETT PACKARD ENTERPRISE DEVELOPMENT LP, Houston, TX (US)

(72) Inventors: Saumya Dikshit, Bangalore (IN); Rajeev Jain, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 365 days.

(21) Appl. No.: 17/813,103

(22) Filed: Jul. 18, 2022

(65) Prior Publication Data
US 2024/0022451 A1 Jan. 18, 2024

(51) Int. Cl.
*H04L 12/46* (2006.01)
*H04L 12/42* (2006.01)
(Continued)

(52) U.S. Cl.
CPC .......... *H04L 12/4641* (2013.01); *H04L 12/42* (2013.01); *H04L 45/04* (2013.01); *H04L 45/645* (2022.05)

(58) Field of Classification Search
CPC ..... H04L 12/4641; H04L 12/42; H04L 45/04; H04L 12/4633; H04L 43/0841; H04L 47/20
See application file for complete search history.

(56) References Cited

U.S. PATENT DOCUMENTS

| 11,153,199 B2* | 10/2021 | Biradar | H04L 43/0841 |
| 2016/0134520 A1* | 5/2016 | Kapadia | H04L 45/54 370/392 |

(Continued)

FOREIGN PATENT DOCUMENTS

| CN | 109218158 A | * | 1/2019 | ......... H04L 12/4641 |
| CN | 111131030 A | * | 5/2020 | |

OTHER PUBLICATIONS

R. Davoli and M. Goldweber, "VXVDE: A Switch-Free VXLAN Replacement," 2015 IEEE Globecom Workshops (GC Wkshps), San Diego, CA, USA, 2015, pp. 1-6, doi: 10.1109/GLOCOMW.2015.7414109. (Year: 2015).*

(Continued)

*Primary Examiner* — Ayaz R Sheikh
*Assistant Examiner* — Louis Samara
(74) *Attorney, Agent, or Firm* — Hewlett Packard Enterprise Patent Department

(57) ABSTRACT

In an example, a network switch is to receive a loop detect packet from an access netwssork connected to a Data center network (DCN). The DCN includes a VXLAN overlay and the network switch is configured as a VTEP. The network switch compares the VNI of a source VTEP from which the loop detect packet originates with a locally configured VNI. In response to a match, it is determined that the network switch is configured as a peer VTEP. Import RT in the loop detect packet is compared with an export RT of the peer VTEP and the export RT in the loop detect packet is compared with an import RT of the peer VTEP. Based on the comparison, it is determined whether a VXLAN tunnel is configured between the peer and the source VTEPs. In response to the VXLAN tunnel being configured, the switch may determine that a network loop is present.

20 Claims, 5 Drawing Sheets

(51) Int. Cl.
*H04L 45/02* (2022.01)
*H04L 45/645* (2022.01)

(56) References Cited

U.S. PATENT DOCUMENTS

| | | | |
|---|---|---|---|
| 2016/0381015 A1* | 12/2016 | Ravinutala | H04L 63/0272 726/7 |
| 2018/0013687 A1* | 1/2018 | Jin | H04L 47/36 |
| 2019/0036809 A1* | 1/2019 | Manthiramoorthy | H04L 47/20 |
| 2020/0021523 A1* | 1/2020 | Wang | H04L 12/4633 |
| 2020/0036654 A1* | 1/2020 | John Bosco Sesu Annamary | H04L 45/02 |
| 2021/0160173 A1* | 5/2021 | Biradar | H04L 43/0841 |

OTHER PUBLICATIONS

Arista, "Loop protection on a redundant VxLAN topology", available online at <https://aristanetworks.force.com/AristaCommunity/s/question/0D52I00007ERqAqSAL/loop-protection-on-a-redundant-vxlan-topology>, Jan. 30, 2019, 4 pages.

Juniper Networks, Inc., "Spanning-Tree Protocols User Guide", Jun. 29, 2022, 485 pages.

Krattiger, Lukas, "Detecting and Mitigating Loops in VXLAN Networks", Cisco., available online at <https://blogs.cisco.com/datacenter/detecting-and-mitigating-loops-in-vxlan-networks#:~:text=STP%20builds%20a%20single%20tree,network%20to%20avoid%20creating%20loops.&text=VXLAN%20is%20the%20most%20prevalent,loop%2Dfree%20VXLAN%20overlay%20network>, Sep. 16, 2020, 12 pages.

Sangli, et al., "BGP Extended Communities Attribute", Network Working Group, Request for Comments: 4360, Feb. 2006, 12 pages.

* cited by examiner

LOOP DETECTION IN VIRTUAL EXTENSIBLE LOCAL AREA NETWORK OVERLAY

BACKGROUND

Generally, in a communications network a network loop may said to be formed when a network has more than one active data paths carrying information from the same source to the same destination. The information recirculates in the network loop and amplifies itself using the additional path instead of stopping when it reaches its destination and thereby may cause broadcast storms flooding the network. A network loop may be formed in any network of connected network devices due to misconfiguration of switches or due to parallel links connecting client devices in a network. There may be several other reasons behind occurrence of a network loop.

A network loop may also be formed in an access network connecting customers to a datacenter network (DCN). The DCN may have an underlay network which includes the physical network infrastructure of network devices for transporting packets from source to destination and an overlay network which is a virtual network deployed on top of the underlay network. A layer 2 (L2) network in a DCN may be stretched across multiple layer 3 (L3) networks by implementing overlays. The network loop may be formed in an overlay or underlay network of the DCN.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1A:
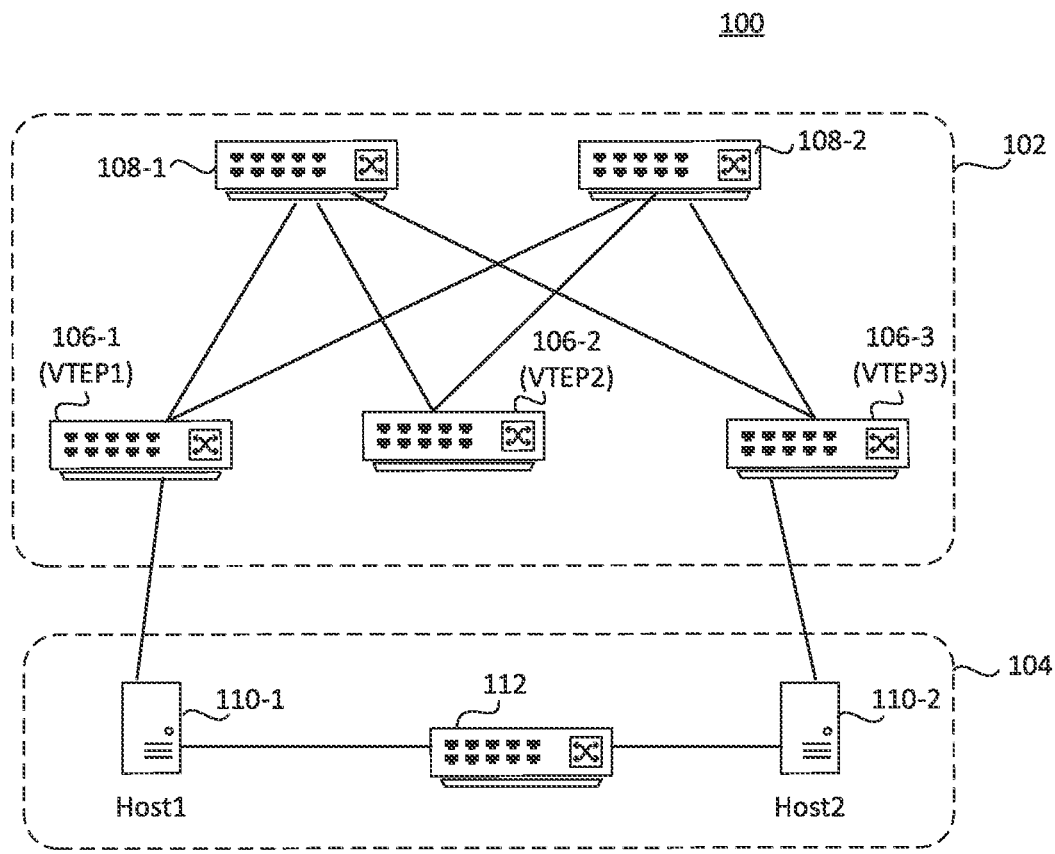
FIG. 1A schematically illustrates a network environment implementing a network switch for network loop detection, according to an example.

Certain examples have features that are in addition to or in lieu of the features illustrated in the above-referenced figures. Certain labels may be omitted from certain figures for the sake of clarity.

DETAILED DESCRIPTION

The present subject matter involves determining presence of a network loop stretched across an overlay of a DCN by analyzing at least portions of overlay information included in a loop detect packet sent across an access network connected to the DCN. Determining presence of the network loop is based on checking whether the loop detect packet originating from an endpoint in the DCN travels back to another endpoint in the same network segment of the DCN via the access network and additionally verifying if the endpoints and logical links or tunnels between the endpoints are correctly configured. This allows in detection of network loops extending across overlays with greater accuracy.

Traditional mechanisms for loop detection are generally based on sending a loop protect packet carrying a specific source MAC address. The loop protect packet may be sent from a switch in the DCN through the access network. Based on matching of source MAC address of packets received at another switch of the DCN, loop detection may be performed. However, such loop detection does not take into account overlay network configuration in the DCN. In addition, the traditional mechanisms may not consider errors in configuration of endpoints or tunnels in the overlay network which may adversely affect the detection of network loops extending over such overlays. Thus, a network loop in an access network stretched across overlays in a DCN may not be detected based on matching of source MAC address.

Further, even if the overlay network configuration is included in the loop protect packet, detection of network loops in access networks extended over Virtual Extensible Local Area Network (VXLAN) overlays implemented in a DCN may be error prone. As an example, consider a network topology where the DCN has two VXLAN tunnel endpoints (VTEPs) viz., a first VTEP and a second VTEP, configured as a part of the same Virtual Local Area Network (VLAN). Generally, a loop protect packet may originate from the first VTEP in the DCN, travel through the access network and may have the second VTEP in the DCN as its final destination. In response to receiving the loop protect packet, the second VTEP may determine that a network loop exists. However, there are possibilities of false positives in this determination by the second VTEP. A false positive may refer to an erroneous determination that a network loop is present in the network even though no network loop is there.

In some scenarios, though the first and second VTEPs may be configured, the VLAN to Virtual Network Identifier (VNI) mapping, which is a pre-requisite for VXLAN overlay implementation, may be absent in the VTEPs. If the VLAN is not mapped to a VNI, overlay network configuration of the VXLAN overlay may be understood to be incomplete and hence the overlay network may not be able to carry data traffic. As the overlay network does not carry data traffic, any data path of the network loop via the overlay network remains inactive and thus in effect the network loop may not exist. However, the second VTEP may still receive the loop protect packet originating from the first VTEP via its access ports. Because determination of network loop using loop protect packets is generally solely based on receipt or non-receipt of the loop protect packet at the second VTEP, the network loop may be determined to be present even if the overlay network does not transport data, which leads to false positives.

Further, mere presence of the VLAN to VNI mapping in the VTEPs may not allow for transporting packets from the first VTEP to the second VTEP via the overlay network. Packets may be generally transported via the overlay network from the first VTEP to the second VTEP using a VXLAN tunnel which is a virtual tunnel for carrying encapsulated VXLAN packets between VTEPs. In some examples, the VXLAN tunnel may not be configured between the first and second VTEPs resulting in no flow of traffic between the first and second VTEPs via the overlay network. In such scenarios also, the second VTEP may receive the loop protect packet via its access ports from the first VTEP and incorrectly determine presence of a network loop giving rise to false positives.

Techniques described herein involves checking whether a loop detect packet sent by a source VTEP in a DCN via an access network is received back by a peer VTEP in the DCN. In addition to that, the present techniques include verifying, based on VLAN to VNI mapping, whether the source and peer VTEPs are correctly configured to carry data traffic in the VXLAN overlay and whether a VXLAN tunnel is configured between the source and peer VTEPs. Because detection of the network loop is performed based on comparison of VNIs between the source and peer VTEPs and after verifying that a VXLAN tunnel is configured between the source and peer VTEPs, false positives in loop detection may be reduced. Thus, the proposed techniques may provide for more accurate network loop detection in access networks extended over overlays implemented in a DCN.

In an example, a network switch may receive a loop detect packet from an access network. The network switch may be a switch in a DCN and used to connect customers to the DCN. The DCN may include a Border Gateway Protocol (BGP)-Ethernet Virtual Private Network (EVPN) based VXLAN overlay and the network switch may be configured as a VTEP in the VXLAN overlay. In a BGP-EVPN based VXLAN overlay, EVPN functions as a control plane that may enable hosts to be placed anywhere in a network and remain connected to the same logical layer 2 overlay network, and VXLAN functions as the data plane for the logical layer 2 overlay network. The control plane includes a set of services within the network that perform traffic management functions, including security, routing, load balancing, and analysis. BGP is a routing protocol that makes dynamic routing decisions based on paths, network policies, etc., and enables exchange of routing and reachability information among network devices, such as routers, connecting through BGP. The switch may analyze the loop detect packet comprising a VNI of a source VTEP from which the loop detect packet originated, a Virtual LAN Identifier (VLAN ID) of a VLAN mapped to the VNI, an Internet Protocol (IP) address of the source VTEP, an import Route Target (RT) and an export RT of the VLAN indicating routes to be imported into and exported from a Virtual Routing and Forwarding (VRF) table of the VLAN. A VNI may be used to uniquely identify a VXLAN segment from another VXLAN segment. A VXLAN network segment identified by a VNI may be mapped to a VLAN segment identified by a VLAN ID. RT is a type of a BGP extended community used to transfer routes between VPNs.

In an example, the switch may compare the VNI of the source VTEP with a locally configured VNI of the switch. In response to a match between the VNI of the source VTEP with the locally configured VNI, the switch may determine that the network switch is configured as a peer VTEP of the source VTEP. The switch may then compare the import RT in the loop detect packet with an export RT of the peer VTEP and the export RT in the loop detect packet with an import RT of the peer VTEP. Based on the comparison, the switch may determine, whether a VXLAN tunnel is configured between the peer VTEP and the source VTEP. In response to determining that the VXLAN tunnel is configured, the switch may determine that a network loop is present in the VLAN mapped to the VNI. In some examples, on determining presence of the network loop, the switch may generate a notification indicating loop detection to a network administrator and the network administrator may make modifications in the network configuration to remove the network loop. Thus, network loops in an access network extending over overlays in a DCN may be detected and removed in an access network stretched over overlays in a DCN.

The described systems and methods may be implemented in various switches in a communication network. Although, the description above is with reference to access switches, the methods and described techniques may be implemented in other type of switches implementing different communication techniques, albeit with a few variations. Various implementations of the present subject matter have been described below by referring to several examples.

The above systems and methods are further described with reference to FIG. 1A to FIG. 5. It should be noted that the description and figures merely illustrate the principles of the present subject matter along with examples described herein and should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

FIG. 1A illustrates a network environment 100 implementing a network switch for network loop detection, according to an example. The network environment 100 includes a DCN 102 and an access network 104. The DCN 102 refers to a collection of network resources including switching, routing, load balancing, analytics, etc. which may facilitate the storage and processing of applications and data in a data center. In an example, the DCN 102 may include a DCN having a leaf-spine topology. In the leaf-spine topology there may be two tiers of switches, where each lower-tier switch (a leaf switch) may connect to every higher-tier switch (a spine switch) in a mesh topology. A server sending data to another server sends the data through a leaf switch to a spine switch, which then directs the traffic to the destination server's leaf switch. Since every leaf switch connects to every spine switch, there is network resiliency. If one spine switch goes down, a leaf switch can still connect to the network's backbone. The DCN 102 of FIG. 1A includes leaf switches 106-1, 106-2, and 106-3, collectively referred as leaf switches 106 connected over a mesh topology with spine switches 108-1 and 108-2, collectively referred as spine switches 108.

Each of the switches 106 and 108 may be implemented as, but not limited to, a switching unit, a switch-router, or any device capable of switching data packets provide connectivity between hosts in the access network and a public network, such as the DCN 102. Further, although some switches 106 and 108 have been depicted in the DCN 102, it would be understood that the DCN may implement several other switches, routers, and hosts.

An access network includes a user/customer network that connects customers to a particular DCN so that the customer can access resources of the DCN. In an example, the access network may be managed by the customer. The access network may include a Local Area Network (LAN) with host devices interconnected by network switches. As shown in FIG. 1, the access network 104 includes host devices 110-1 and 110-2, collectively referred as host devices 110. The access network 104 includes two host devices, viz., host1 110-1 and host2 110-2. Host1 110-1 may be a computing device that communicates with other hosts, such as host2 110-2, on the access network 104. Hosts on a network may include clients and servers that send or receive data, services or applications. Host1 and host2 may be connected over a physical link via a switch 112. In an example, the switch 112 may be a layer 2 switch similar to the switches 106 or 108.

The DCN 102 also includes network virtualization overlays (NVOs) implemented in the leaf switches 106 and the spine switches 108. NVOs includes implementing software-based virtualization to create additional layers of network abstraction (also called software-based network overlays) that can be run on top of the physical network, often providing new applications or security benefits.

VXLAN is such an NVO. VXLAN allows layer 2 connections to be stretched over a layer 3 network by encapsulating ethernet frames in a VXLAN packet that includes IP addresses. Thus, VXLAN is a layer 2 overlay on top of a layer 3 underlay network. Using VXLAN, traffic may pass through the layer 3 routing architecture while using the layer 2 data packet addresses for routing. VXLAN endpoints, which terminate VXLAN tunnels may be either virtual or physical switch ports also called VTEPs. VTEPs encapsulate VXLAN traffic entering a VXLAN tunnel and de-encapsulate that traffic when it leaves the VXLAN tunnel. To encapsulate an ethernet frame, a VTEP may add a number of fields including a VXLAN header. In an example, the VXLAN header may include a VXLAN Network Identifier (VNI) which may be used to uniquely identify a VXLAN segment from another VXLAN segment. A VXLAN segment corresponds to a logical subdivision of a VXLAN.

A VXLAN segment identified by a VNI may be mapped to a VLAN segment identified by a VLAN ID. In some examples, a VNI may be mapped to a VLAN ID to extend a VLAN across a layer 3 infrastructure. Therefore, a VLAN ID is associated with a VNI in a VXLAN environment which allows to transport a VLAN across an underlying layer 3 infrastructure.

In an example, the VXLAN overlay may be established based on Border Gateway Protocol-Ethernet Virtual Private Network (BGP-EVPN) connectivity. In such examples, EVPN functions as a control plane that may enable hosts to be placed anywhere in a network and remain connected to the same logical layer 2 overlay network, and VXLAN functions as the data plane for the logical layer 2 overlay network. BGP is a routing protocol that makes dynamic routing decisions based on paths, network policies, etc., and enables exchange of routing and reachability information among network devices, such as routers, connecting through BGP. In an example, BGP may enable two remote sites connected through a Virtual Private Network (VPN) tunnel to exchange routing information. In some examples, EVPN may use a Multiprotocol-BGP mechanism and define a new sub-address family, such as an EVPN address family, in a Layer 2 VPN address family. In the EVPN address family, an EVPN Network Layer Reachability Information (NLRI) may be added. EVPN NLRI may define several types of BGP-EVPN routes, which carry information such as the host IP address, MAC address, and VXLAN Network Identifier (VNI). After a VTEP learns the IP address and MAC address of a connected host, the VTEP can send the information to other VTEPs through MP-BGP routes. In this way, learning of host IP address and MAC address information can be implemented on the control plane.

In the example of FIG. 1, each of the leaf switches 106 may be configured as a VTEP. Thus, leaf switch 106-1 may be referred to as VTEP1, 106-2 as VTEP2, and 106-3 as VTEP3. VTEP3 may be a tunnel endpoint which may connect to the VTEP1 via virtual tunnels in the overlay network. Thus, VTEP3 may be considered as a peer VTEP with reference to VTEP1 and vice versa. Peer VTEPs share a group address and have at least one VNI in common so that peer learning occurs and traffic is not dropped.

As can be seen in the network environment 100 of FIG. 1, a network loop is formed between the host1 and host2. The network loop may be formed because, there may be more than one active data path carrying information between host1 110-1 and host2 110-2. One data path may be through the VXLAN overlay of the DCN 102 via VTEP1 and VTEP3 and another path may be via the switch 112 in the layer 2 access network 104. Thus, the network loop includes multiple active data paths through the overlay network in the DCN 102 and through the access network 104. Host1 may send data traffic destined to host2 to VTEP1 which may forward the data to VTEP2/VTEP3 via VXLAN tunnels in overlay network of the DCN 102 from where the data packets may be forwarded to host2. The switch 112 connecting host1 and host2 forms a parallel L2 link between the hosts thereby creating an additional active data path for the data traffic and resulting in the network loop.

The DCN 102 and the access network 104 may be a wired network, a wireless network, or a combination thereof. The DCN 102 and the access network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

Figure 1B:
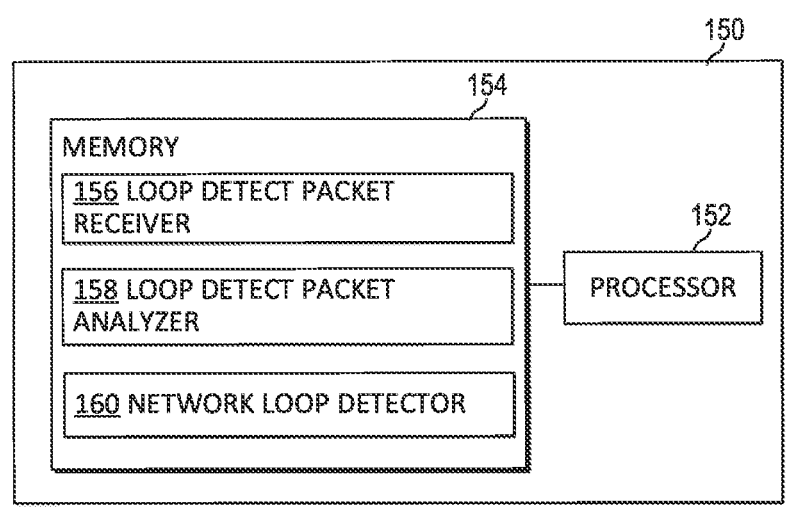
FIG. 1B is a block diagram of an example network switch for network loop detection, according to an example.

Turning now to FIG. 1B an example network switch 150 is shown. The network switch 150 may be similar to one or more of the leaf switches 106 illustrated in FIG. 1A. In examples discussed herein, the network switch 150 may be considered to operate as a leaf switch in a DCN. Network switch 150 may include a processor 152 and a memory 154 that may be coupled to each other through a communication link (e.g., a bus). Processor 152 may include a single or multiple Central Processing Units (CPU) or another suitable hardware processor(s), such as a network ASIC. Memory 154 may be a machine-readable storage medium that may store machine readable instructions executed by processor 152. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for loop detect packet receiver 156, loop detect packet analyser 158, and network loop detector 160.

Processor 152 may execute loop detect packet receiver 156 to receive a loop detect packet from an access network. In an example, the loop detect packet may be a layer 2 Protocol Data Unit (PDU) carrying source MAC as the reserved MAC for a particular Original Equipment Manufacturer (OEM). The reserved MAC may be a predefined MAC carried in the loop detect packet which uniquely identifies the loop detect packet from other traffic. In an example, the loop detect packet may originate from an access port of a source VTEP in the DCN and may travel via switches in the access network and may be received at an access port of the network switch 150 in the DCN. The loop detect packet may include a VNI of the source VTEP, a VLAN ID of a VLAN mapped to the VNI, and an IP address of the source VTEP. In some examples, the loop detect packet may include an import Route Target (RT) and an export RT of the VLAN. In an example, RT is a type of a BGP extended community used to transfer routes between VPNs. The RT appears in a field in the update messages exchanged between BGP peers. In this case, the import RT may indicate layer 2 routes to be imported into a Virtual Routing and Forwarding (VRF) table of the VLAN and the export RT may indicate layer 2 routes to be exported from the VRF table of the VLAN.

Processor 152 may execute loop detect packet analyser 158 to compare the VNI of the source VTEP with a locally configured VNI of the network switch 150. The locally configured VNI of the network switch 150 may identify a VXLAN segment configured at the access port of the network switch 150 at which the loop detect packet is received. In response to a match between the VNI of the source VTEP with the locally configured VNI, processor 152 may execute loop detect packet analyser 158 to determine that the network switch 150 is configured as a peer VTEP of the source VTEP.

Processor 152 may execute loop detect packet analyser 158 to compare the import RT in the loop detect packet with an export RT of the peer VTEP. The export RT of the peer VTEP corresponds to a RT in any of the VLANs configured in the network switch 150 receiving the loop detect packet. Thus, the import RT in the loop detect packet is compared with export RTs of each of the VLANs configured in the network switch 150. Further, the processor 152 may execute loop detect packet analyser 158 to compare the export RT in the loop detect packet with an import RT of the peer VTEP. The import RT of the peer VTEP corresponds to an RT in any of the VLANs configured in the network switch 150 receiving the loop detect packet. Thus, the export RT in the loop detect packet is compared with import RTs of each of the VLANs configured in the network switch 150.

Processor 152 may execute loop detect packet analyser 158 to determine, based on the comparison, whether a VXLAN tunnel is configured between the peer VTEP, i.e., the network switch 150 and the source VTEP from which the loop detect packet originated. In an example, in response to a match between the export RT in the loop detect packet with any one of the import RTs of the peer VTEP or a match between import RT in the loop detect packet with any one of the export RTs in the network switch 150, the processor 152 may determine that the VXLAN tunnel is configured between the network switch 150 and the source VTEP generating the loop detect packet.

Processor 152 may execute network loop detector 160 to determine that a network loop is present in the VLAN mapped to the VNI, in response to determining that the VXLAN tunnel is configured between the network switch 150 and the source VTEP. Thus in an example, the network loop formed between two host devices in the access network may be detected.

Turning to FIG. 1A, VTEP1 configured in switch 106-1 may generate a loop detect packet. In an example, the loop detect packet may be a loop detect Protocol Data Unit (PDU) which may include a loop detect payload and loop detect overlay information. In an example, the loop detect payload may include a source MAC address of the switch 106-1 from which it originates and a destination MAC address of another switch, such as switch 106-3 in the DCN 102. In an example, the loop detect overlay information may be encoded in a Type-Length-Value (TLV) encoding format. The loop detect overlay information may include a VTEP IP of VTEP1, i.e., the source VTEP. Further the loop detect overlay information also includes a VNI of VTEP1, a VLAN ID of a VLAN mapped to the VNI, an import Route Target (RT) and an export RT of the VLAN. In some examples, the VNI and the VLAND ID may be included in the loop detect packet as a single information unit called a VNI to VLAN mapping. Below is an example configuration of the network switch 106-1 functioning as VTEP1.

| VTEP1 configuration: | |
|---|---|
| "evpn | |
| vlan 10 | // EVPN enabled VLAN configuration |
|   rd auto | // Route Distinguisher set as "auto" |
|   route-target export 65001:10 | // Route Target for exporting layer 2 MAC addresses |
|   route-target import 65001:11 | // Route Target for importing layer 2 MAC addresses |
| interface vxlan 1 | |
|   source ip 192.168.11.3 | // IP address of VTEP1 |
|   vni 10010 | |
|     vlan 10" | // VNI to VLAN mapping |

In the above example configuration of VTEP1, EVPN is enabled for "VLAN 10". In the VXLAN interface configuration, the IP address "192.168.11.3" of VTEP1 is mentioned and a VNI to VLAN mapping between "VNI 10010" and "VLAN 10" is also included. The "route-target export 65001:10" denotes that layer 2 MAC routes from a VRF associated with the VLAN 10 is to be exported to a VRF tagged as "65001:10". The "route-target import 65001:11" denotes that layer 2 MAC routes from the VRF tagged as "65001:11" is to be imported to a VRF associated with the "VLAN 10". Although in this example, the import RT and the export RT refer to different VRFs, the import RT and the export RT may also refer to identical VRFs.

In the network environment 100 of FIG. 1A, the VTEP1 may send the loop detect packet via an access port connected to host1 110-1. Since, the loop detect packet includes MAC address of the switch 106-3 as the destination MAC address, the loop detect packet may be forwarded by the host1 110-1 to switch 112. The switch 112 forwards the loop detect packet to host2 110-2 which may again forward the loop detect packet to switch 106-3 back to the DCN 102. Thus, loop detect packet receiver 156 in the switch 106-3 may receive the loop detect packet.

The loop detect packet analyzer 158 may compare the VNI of the source VTEP, i.e., VTEP1 in this case, with a locally configured VNI of the switch 106-3. In an example, a locally configured VNI of the switch 106-3 refers to a VNI associated with VTEP3 configured in the switch 106-3. In response to a match between the VNI of the source VTEP, i.e., VTEP1 with the locally configured VNI of VTEP3 in switch 106-3, the loop detect packet analyzer 158 may determine that the switch 106-3 is configured as a peer VTEP of the source VTEP, VTEP1. Thus, VTEP3 may be identified as a peer VTEP of VTEP1, i.e., VTEP1 and VTEP3 is part of the same VXLAN segment.

The loop detect packet analyzer 158 of the switch 106-3 may compare the import RT in the loop detect packet with an export RT of the peer VTEP, VTEP3. In an example, loop detect packet analyzer 158 may compare the import RT in the loop detect packet with each of a plurality of export RTs associated with a corresponding VLAN configured in the VTEP3. In response to a match between the import RT in the loop detect packet with one of the plurality of export RTs, the loop detect packet analyzer 158 may identify that a VXLAN tunnel is configured between the peer VTEP, VTEP3 and the source VTEP, VTEP1.

Further, the loop detect packet analyzer 158 of the switch 106-3 may also compare the export RT in the loop detect packet with an import RT of the peer VTEP, VTEP3. In an example, loop detect packet analyzer 158 may compare the export RT in the loop detect packet with each of a plurality of import RTs associated with a corresponding VLAN configured in the peer VTEP. In response to a match between the export RT in the loop detect packet with one of the plurality of import RTs, the loop detect packet analyzer 158 may identify that a VXLAN tunnel is configured between the peer VTEP, VTEP3 and the source VTEP, VTEP1. Example configurations of the source VTEP, VTEP1 and peer VTEP, VTEP3 are shown below.

```
VTEP1 configuration:
"Evpn
   Vlan 10
      route-target export 65001:10
      route-target import 65001:11
   interface vxlan 1
      source ip 192.168.11.3
      vni 10010
      vlan 10"
VTEP3 configuration:
"Evpn
   Vlan 10
      route-target export 65001:100
      route-target import 65001:110
   Vlan 20
      route-target export 65001:11
      route-target import 65001:10"
```

Now as seen from the example configurations, EVPN configuration is enabled for VLAN 10 in the source VTEP, VTEP1. Thus, in this example, the loop detect packet generated by VTEP1 may include import RT as "65001:11" and export RT as "65001:10". On receiving such a loop detect packet, the loop detect packet analyzer 158 in the switch configured as the peer VTEP, VTEP3 may compare the import RT in the loop detect packet "65001:11" with export RT "65001:100" associated with VLAN 10 and export RT "65001:11" associated with VLAN 20. On comparison, the loop detect packet analyzer 158 may determine that the import RT associated with VLAN 10 in the loop detect packet matches with the export RT associated with VLAN 20 in the switch receiving the loop detect packet, i.e., switch 106-3 in this example. In response to such a match between the import RT in the loop detect packet with export RT "65001:11" associated with a different VLAN, the loop detect packet analyzer 158 may identify that a VXLAN tunnel is configured between the source VTEP, VTEP1 and the peer VTEP, VTEP3. Similarly, in the above example configurations, the export RT "65001:10" associated with VLAN 10 in the loop detect packet matches with the import RT "65001:10" associated with VLAN 20 in the peer VTEP, VTEP3. In response to such a match between the export RT in the loop detect packet with import RT "65001:10" associated with a different VLAN, the loop detect packet analyzer 158 may identify that a VXLAN tunnel is configured between the source VTEP, VTEP1 and the peer VTEP, VTEP3. It may be noted that in the above example configurations, any one match either between the import RT associated with VLAN 10 in the loop detect packet with the export RT associated with VLAN 20 in the peer VTEP or the export RT associated with VLAN 10 in the loop detect packet with the import RT associated with VLAN 20 in the peer VTEP is sufficient to conclude that a VXLAN tunnel is configured between the source VTEP, VTEP1 and the peer VTEP, VTEP3.

In response to determining that the VXLAN tunnel is configured between VTEP1 and VTEP3, network loop detector 160 in the switch 106-3 may determine that a network loop is present in the VLAN mapped to the VNI common to VTEP1 and VTEP3. That is, the network loop detector 160 in the switch 106-3 may determine that the network loop is present in the subnetwork VLAN 10 mapped to VXLAN segment VNI 10010.

In an example, in response to determining that the network loop is present, the network loop detector 160 in the switch 106-3 may generate a notification indicating loop detection to a network administrator. In an example, a message may be forwarded to a network management system to indicate that a network loop is present in a subnetwork mapped to a VXLAN segment between the DCN 102 and the access network 104. In another example, in response to determining that the network loop is present, the network loop detector 160 in the switch 106-3 may disable an access port in the switch 106-3 configured in the VLAN 10 mapped to the VNI 10010. Once the access port of the switch 106-3 configured in the VLAN 10 mapped to the VNI 10010 is disabled, the network loop no longer exists. Thus, in response to a determination that the network loop is present, disabling of the access port of the switch 106-3 configured in the VLAN 10 mapped to VNI 10010 may remove the network loop prevent broadcast storm of packets in the network environment 100.

Figure 2:
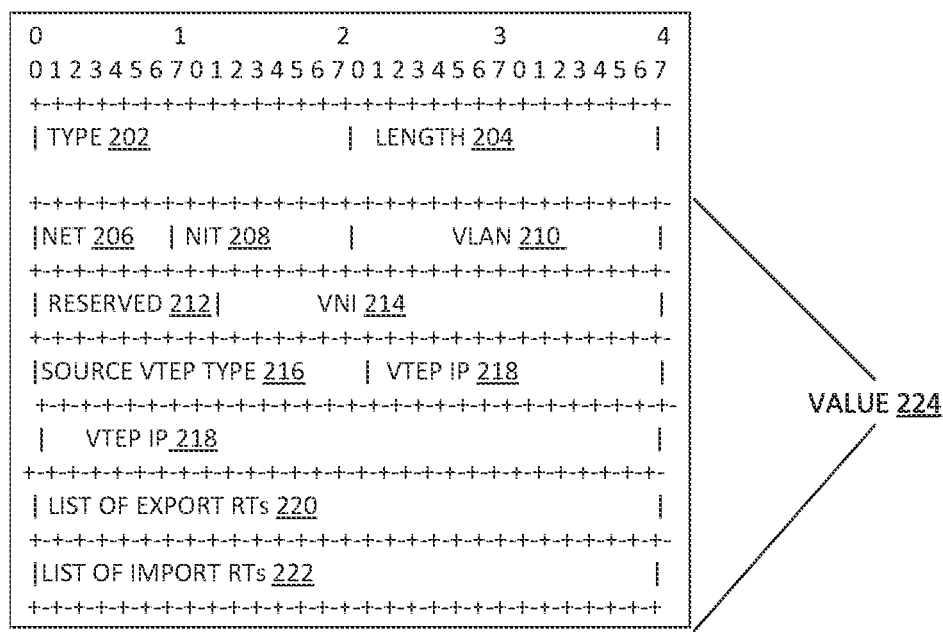
FIG. 2 is a loop detect packet used for network loop detection, according to an example.

FIG. 2 illustrates an example loop detect overlay TLV sequence 200, according to an example of the present subject matter. The loop detect overlay TLV sequence 200 represents a set of sequential bits carrying overlay information associated with the loop detect packet. TLV is an encoding scheme used for optional informational elements in a certain protocol. A TLV-encoded data stream contains information related to a record type, a record value's length, and a record value itself. The loop detect overlay TLV sequence 200 includes loop detect overlay information encoded in the TLV format. In an example, the loop detect overlay TLV sequence 200 may be included within an ethernet frame originating from a source VTEP in a DCN, such as VTEP1 in the DCN 102 of FIG. 1A. In an example, the loop detect overlay TLV sequence 200 may be carried within an ethernet frame carrying a loop detect payload with MAC source and destination of the loop detect payload. The loop detect overlay TLV sequence 200 includes type information of 2 octets. The type 202 may be a binary or alphanumeric code, which indicates the kind of field that this part of the message represents. The length 204 represents the size of the value field. The length 204 field may be 2 octets. The value 224 represents the record value, a series of bytes of variable sizes which contain data for this part of the message. The value 224 includes a number of other fields such a number of export target (NET) 206, a number of import target (NIT) 208, VLAN 210, Reserved 212, VNI 214, Source VTEP type 216, VTEP IP 218, list of export RTs 220, list of import RTs 222.

The NET 206 field in the loop detect overlay TLV sequence 200 represents a number of VRFs to which layer 2 routes may be exported. The NIT 208 field in the loop detect overlay TLV sequence 200 represents a number of VRFs from which layer 2 routes may be imported. NET 206 and NIT 208 may be 8 bits fields each. VLAN 210 represents a field in the loop detect overlay TLV sequence 200 to capture a VLAN ID enabled at an access port of the source VTEP from which the loop detect packet originates. The field VLAN 210 may be 2 octets. Reserved 212 represents a field reserved for additional information. Reserved 212 may be 8 bits. VNI 214 represents a field to capture a VNI identifying a VXLAN segment configured in an access port of the source VTEP from which the loop detect packet originates. The VNI field may include 24 bits for capturing the VNIs. Thus, the loop detect packet may include a VLAN to VNI mapping as captured in the fields VLAN 210 and VNI 214.

Source VTEP type 216 is a field that indicates the type of IP address used to identify the source VTEP. For example, the source VTEP type 216 may indicate that the IP address used to identify the source VTEP is an IPv4 address or an IPv6 address. The source VTEP type 216 includes 2 octets in the loop detect overlay TLV sequence 200. VTEP IP 218 is a field that captures the VTEP IP of the source VTEP. In an example, the VTEP IP 218 may be 32 bits to 128 bits long.

List of export RTs 220 is a field that includes tags of VRFs to which layer 2 routes are to be exported from the VLAN enabled at the access port of the source VTEP from which the loop detect packet originates. The number of VRF tags in the list of export RTs 220 match the NET 206. List of import RTs 222 is a field that includes tags of VRFs from which layer 2 routes are to be imported into the VLAN enabled at the access port of the source VTEP from which the loop detect packet originates. The number of VRF tags in the list of import RTs 222 matches the NIT 208.

Figure 3:
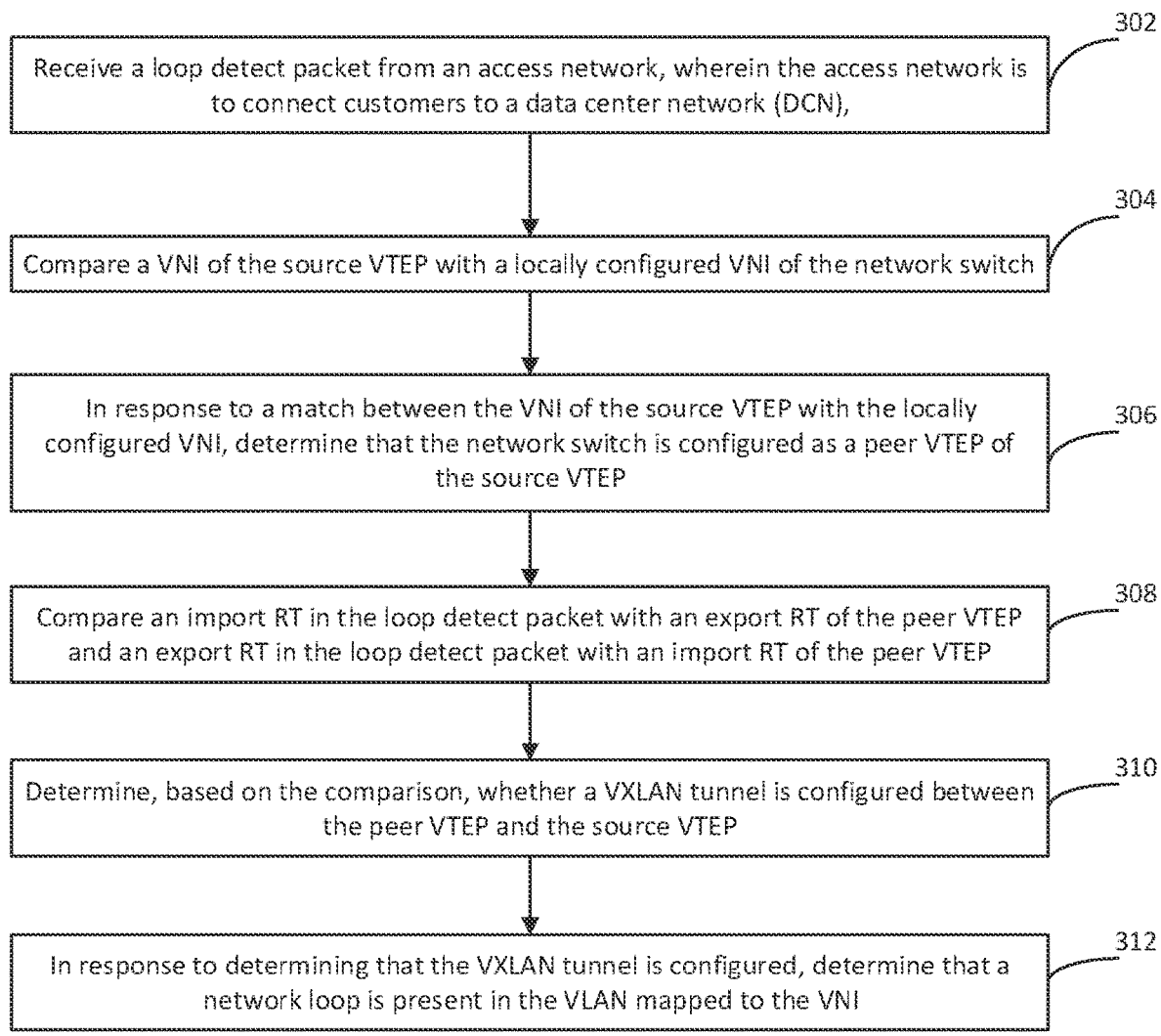
FIG. 3 is a flowchart illustrating a method for network loop detection, according to an example.

FIG. 3 is a flowchart illustrating a method 300 for loop detection, according to an example. Method 300 may be executed on a network switch, such as the switch 106-3 in the computing environment 100 FIG. 1.

At block 302, a switch may receive a loop detect packet from an access network. The access network is to connect customers to a DCN. In some examples, the access network is managed by a customer and may include host devices and switches. In an example, the switch may be a part of the DCN and the loop detect packet may originate from another switch in the DCN. The DCN may include a BGP EVPN based VXLAN overlay and the switch may be configured as a VTEP in the VXLAN overlay.

The loop detect packet comprises a VNI of a source VTEP from which the loop detect packet originated. In an example, the source VTEP may be configured in a switch in the DCN. The loop detect packet may also include a VLAN ID of a VLAN mapped to the VNI, an IP address of the source VTEP, an import RT and an export RT of the VLAN indicating routes to be imported into and exported from VRF table of the VLAN. The import RT and export RT may indicate VRFs tags from/to which layer 2 routes are to imported or exported.

At block 304, the switch may compare the VNI of the source VTEP with a locally configured VNI of the network switch. The locally configured VNI of the switch may identify a VXLAN segment configured at the access port of the switch at which the loop detect packet is received. In an example, the VNI configured for the VXLAN segment associated with an access port of the source VTEP from which the loop detect packet originated is compared with the VNI enabled in the access port of the switch receiving the loop detect packet. At block 306, in response to a match between the VNI of the source VTEP with the locally configured VNI, the switch may determine that it is configured as a peer VTEP of the source VTEP. That is, the VTEP sending the loop detect packet and the VTEP receiving it is part of the same VXLAN segment.

At block 308, the switch may compare the import RT in the loop detect packet with an export RT of the peer VTEP and the export RT in the loop detect packet with an import RT of the peer VTEP. In an example, if there are multiple export RTs for different VLANs configured in the peer VTEP, the switch may compare the import RT in the loop detect packet with each of the multiple export RTs and look for a match. Similarly, if there are multiple import RTs for different VLANs configured in the peer VTEP, the switch may compare the export RT in the loop detect packet with each of the multiple import RTs and look for a match.

At block 310, the switch may determine, based on the comparison, whether a VXLAN tunnel is configured between the peer VTEP and the source VTEP. In response to a match between the import RT in the loop detect packet and an export RT for one of the VLANs in the switch, the switch may determine that the VXLAN tunnel is configured between the source VTEP and the peer VTEP. Also, in response to a match between the export RT in the loop detect packet and an import RT for one of the VLANs in the switch, the switch may determine that the VXLAN tunnel is configured.

At block 312, in response to determining that the VXLAN tunnel is configured, the switch may determine that a network loop is present in the VLAN mapped to the VNI. In an example, on determining that the VXLAN tunnel is configured, the switch may identify that the EVPN enabled VLAN in the switch that is mapped to the VXLAN segment identified by the VNI of the loop detect packet has the network loop. In some examples, on determining the presence of the network loop the switch may disable an access port configured in the VLAN.

Figure 4:
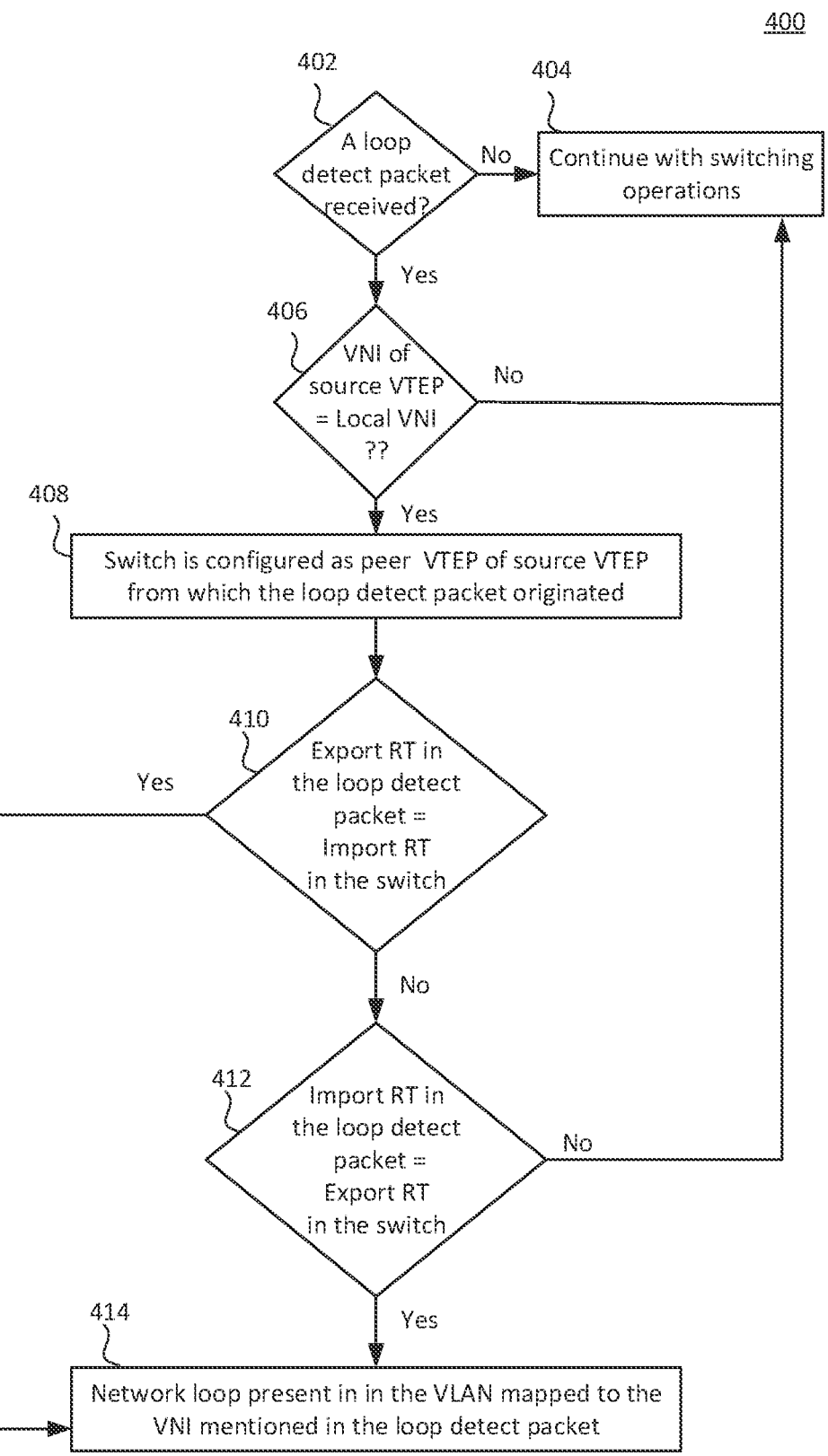
FIG. 4 is a flowchart illustrating another method for network loop detection, according to an example.

FIG. 4 is a flowchart illustrating a method 400 for network loop detection, according to an example. Method 400 may be executed on a network switch, such as the switch 106-3 in the computing environment 100 of FIG. 1.

At block 402, a switch in a DCN may check for packets received over its access ports. An access port acts as an interface between the switch and network devices in an access network of a customer connecting to the DCN. In an example, the switch may continuously monitor its access ports to check if a loop detect packet is received. If no loop detect packet is received ("No" branch from block 402), the switch may continue with its switching operations at block 404.

In response to receiving the loop detect packet ("Yes" branch from block 402), the switch may perform a series of operations to analyse the loop detect packet. In an example, the loop detect packet may originate from another switch in the DCN, such as a leaf switch 106 in the DCN 102 of FIG. 1. In an example, the loop detect packet may be a layer 2 Protocol Data Unit (PDU) carrying source MAC as the reserved MAC for a particular OEM. The source MAC may be a predefined MAC carried in the loop detect packet. The switch receiving the loop detect packet may identify the same based on the predefined source MAC in the loop detect packet. In an example, the loop detect packet may originate from an access port of a source VTEP in the DCN and may travel via switches in the access network to reach the access port of another switch in the DCN. The loop detect packet may include a VNI of the source VTEP, a VLAN ID of a VLAN mapped to the VNI, and an IP address of the source VTEP. In some examples, the loop detect packet may include an import Route Target (RT) and an export RT of the VLAN.

At block 406, the switch may compare the VNI of the source VTEP with a locally configured VNI of the switch. The locally configured VNI of the switch may identify a VXLAN segment configured at the access port of the switch at which the loop detect packet is received. In response to a match between the VNI of the source VTEP with the locally configured VNI ("Yes" branch from block 406), at block 408, the switch may determine that it is configured as a peer VTEP of the source VTEP and vice versa. In other words, the switch may determine that a VTEP configured in the switch and the source VTEP are part of the same VXLAN segment, i.e., they belong to a single VXLAN subnetwork identifiable by a VNI. Peer VTEPs share a group address and have at least one VNI in common so that peer learning occurs and traffic is not dropped. In response to determining that the VNI of the source VTEP does not match with the locally configured VNI in the switch ("No" branch from block 406), the switch may continue with its other switching operations at block 404, since a likelihood of a network loop is less. The VNI of the source VTEP may not match with the locally configured VNI of the switch due to either the switch being configured as a VTEP in a different VXLAN segment or due to absence of any VXLAN configuration in the switch. In either case, the mismatch indicates that the switch is not part of the VXLAN segment of the source VTEP and thus data packets from the source VTEP does not reach the switch via the VXLAN overlay network. Since, data packets from the source VTEP does not reach the switch via the VXLAN overlay network, chances of having an active data path of a probable network loop between them via the VXLAN overlay network is also reduced/eliminated.

At block 410, the switch may compare the export RT in the loop detect packet with each of a plurality of import RTs associated with a corresponding VLAN configured in the peer VTEP. Thus, the export RT in the loop detect packet is compared with import RTs of each of the VLANs configured in the switch. In this step it is checked that whether the export RT in the loop detect packet matches with an import RT for any of the VLANs configured in the peer VTEP. If the export RT matches with an import RT for any of the VLANs in the peer VTEP, it may be understood that a VXLAN tunnel is configured between the source VTEP and the peer VTEP.

In response to a mismatch between the export RT in the loop detect packet and the import RTs ("No" branch from block 410), at block 412, the switch may compare the import RT in the loop detect packet with each of a plurality of export RTs associated with a corresponding VLAN configured in the peer VTEP. Thus, the import RT in the loop detect packet is compared with export RTs of each of the VLANs configured in the switch. In this step it is checked that whether the import RT in the loop detect packet matches with an export RT for any of the VLANs configured in the peer VTEP.

In response to a match between the export RT in the loop detect packet with an import RT in the peer VTEP or a match between the import RT in the loop detect packet with an export RT in the peer VTEP, the switch may determine that the VXLAN tunnel is configured between the switch and the source VTEP generating the loop detect packet. In response to determining that the VXLAN tunnel is configured, at block 414, the switch may determine that a network loop is present in the VLAN mapped to the VN I mentioned in the loop detect packet.

Figure 5:
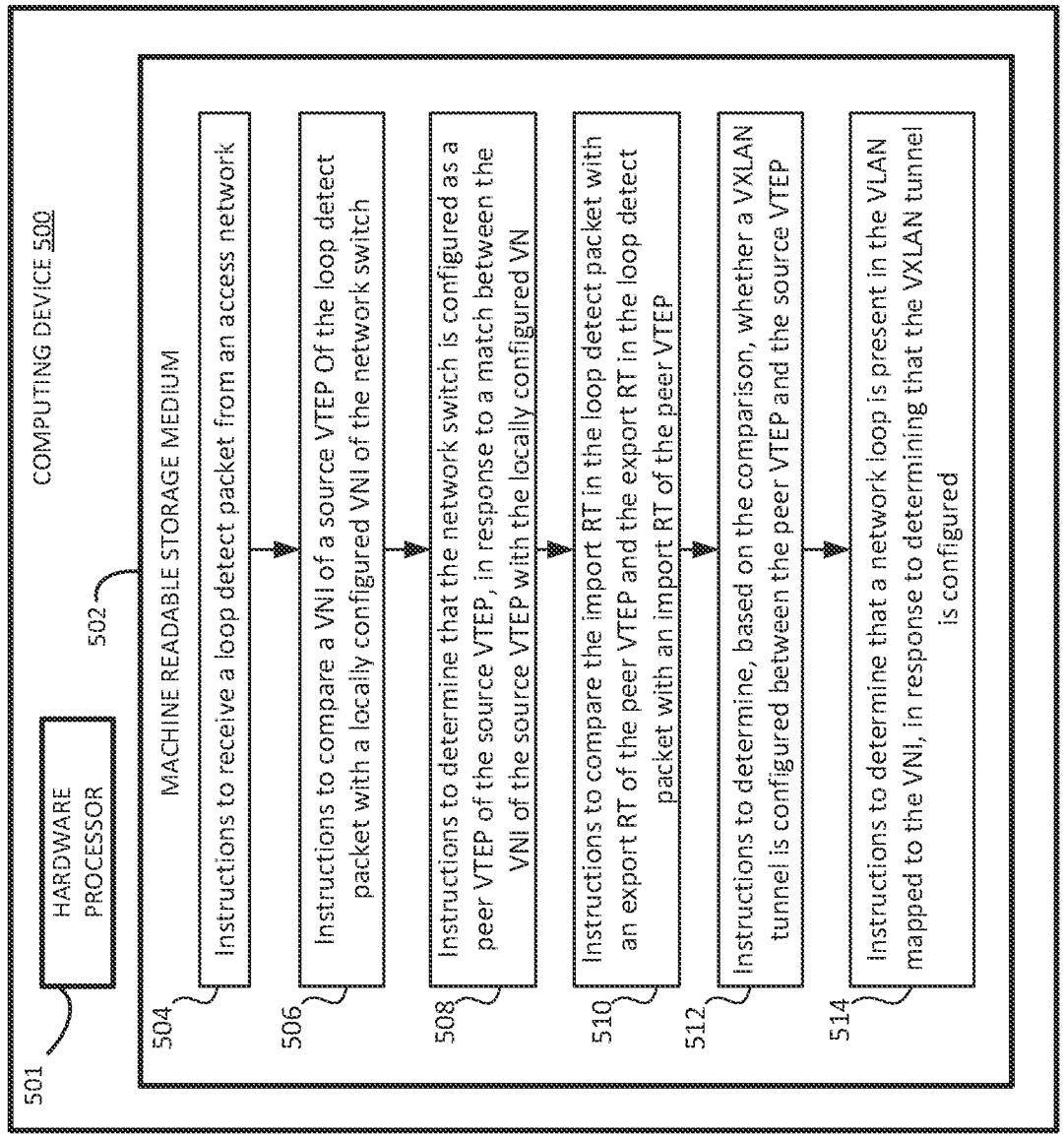
FIG. 5 illustrates a computing device for implementing the method for network loop detection, according an example.

FIG. 5 is an example computing device 500, with a hardware processor 501, and accessible machine-readable instructions stored on a machine-readable medium 502 for implementing one example system, according to one or more disclosed example implementations. In an example, the computing device 500 may be a network switch, such as the switches 106, described above in reference to FIG. 1. FIG. 5 illustrates computing device 500 configured to perform instructions 504-514 described below. However, computing device 500 may also be configured to perform the flow of other methods, techniques, functions, or processes described in this disclosure, such as, for example the method 300 of FIG. 3.

A processing element such as processor 501 may contain one or more hardware processors, where each hardware processor may have a single or multiple processor cores. In one embodiment, the processor 501 may include at least one shared cache that stores data (e.g., computing instructions) that are utilized by one or more other components of processor 501. For example, the shared cache may be a locally cached data stored in a memory for faster access by components of the processing elements that make up processor 501. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 5, the processing elements that make up processor 501 may also include one or more of other types of hardware processing components, such as graphics processing units (GPU), application specific integrated circuits (ASICs), field-programmable gate arrays (FPGAs), and/or digital signal processors (DSPs).

The processor 501 may be operatively and communicatively coupled to a memory. The memory may be a non-transitory computer readable medium, such as the machine readable storage medium 502, configured to store various types of data. For example, the memory may include one or more storage devices that comprise a non-volatile storage device and/or volatile memory. Volatile memory, such as random-access memory (RAM), can be any suitable non-permanent storage device. The non-volatile storage devices can include one or more disk drives, optical drives, solid-state drives (SSDs), tap drives, flash memory, read only memory (ROM), and/or any other type of memory designed to maintain data for a duration of time after a power loss or shut down operation. In certain aspects, the non-volatile storage devices may be used to store overflow data if allocated RAM is not large enough to hold all working data. The non-volatile storage devices may also be used to store programs that are loaded into the RAM when such programs are selected for execution.

The machine-readable storage medium 502 of FIG. 5, may include both volatile and non-volatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

The machine readable medium 502 includes instructions 504 that, when executed by the processor 501, cause a network switch to receive a loop detect packet from an access network. The access network is to connect customers to a DCN. The DCN includes a BGP- EVPN based VXLAN overlay and the network switch is configured as a VTEP in the VXLAN overlay. The instructions 506, when executed by the processor 401, cause the network switch to analyze the loop detect packet comprising a VNI of a source VTEP from which the loop detect packet originated, a VLAN ID of a VLAN mapped to the VNI, an IP address of the source VTEP, an import RT and an export RT of the VLAN indicating routes to be imported into and exported from a VRF table of the VLAN. In an example, the instructions 506, when executed by the processor 401, cause the network switch to compare the VNI of the source VTEP with a locally configured VNI of the network switch. In response to a match between the VNI of the source VTEP with the locally configured VNI, the instructions 508, when executed by the processor 401, cause the network switch to determine that the network switch is configured as a peer VTEP of the source VTEP. The instructions 510, when executed by the processor 401, cause the network switch to compare the import RT in the loop detect packet with an export RT of the peer VTEP and the export RT in the loop detect packet with an import RT of the peer VTEP. The instructions 512, when executed by the processor 401, cause the network switch to determine, based on the comparison, whether a VXLAN tunnel is configured between the peer VTEP and the source VTEP. In response to determining that the VXLAN tunnel is configured, the instructions 514, when executed by the processor 401, cause the network switch to determine that a network loop is present in the VLAN mapped to the VNI.

A network switch as used in the examples herein, is a device that receives network traffic and forwards the network traffic to a destination. Some network switches execute packets services, such as application classification and deep packet inspection, on certain network traffic that is received at the network switch. Some network switches monitor load parameters for various physical and logical resources of the network switch, and report load information to a network orchestrator or an orchestrator.

A switch, as used in the examples herein, forwards data (in control packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

Examples of client devices, as used herein, may include: laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ". Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

We claim:

1. A network switch comprising:
a processor; and
a non-transitory, computer-readable medium including instructions that, when executed by the processor, cause the network switch to:
receive a loop detect packet from an access network, wherein the access network is to connect customers to a data center network (DCN), and wherein the DCN includes a Border Gateway Protocol (BGP)-Ethernet Virtual Private Network (EVPN) based VXLAN overlay and the network switch is configured as a VXLAN Tunnel Endpoint (VTEP) in the VXLAN overlay;
analyze the loop detect packet comprising a VXLAN Network Identifier (VNI) of a source VTEP from which the loop detect packet originated, a Virtual LAN Identifier (VLAN ID) of a VLAN mapped to the VNI, an Internet Protocol (IP) address of the source VTEP, an import Route Target (RT) and an export RT of the VLAN indicating routes to be imported into and exported from a Virtual Routing and Forwarding (VRF) table of the VLAN, wherein to analyze the loop detect packet, the network switch is to:
compare the VNI of the source VTEP with a locally configured VNI of the network switch;
in response to a match between the VNI of the source VTEP with the locally configured VNI, determine that the network switch is configured as a peer VTEP of the source VTEP;
compare the import RT in the loop detect packet with an export RT of the peer VTEP and the export RT in the loop detect packet with an import RT of the peer VTEP;
determine, based on the comparison, whether a VXLAN tunnel is configured between the peer VTEP and the source VTEP; and
in response to determining that the VXLAN tunnel is configured, determine that a network loop is present in the VLAN mapped to the VNI.

2. The network switch of claim 1, wherein to determine whether the VXLAN tunnel is configured between the peer VTEP and the source VTEP the network switch is to:
compare the import RT in the loop detect packet with each of a plurality of export RTs associated with a corresponding VLAN configured in the peer VTEP; and
in response to a match between the import RT in the loop detect packet with one of the plurality of export RTs, identify that the VXLAN tunnel is configured between the peer VTEP and the source VTEP.

3. The network switch of claim 1, wherein to determine whether the VXLAN tunnel is configured between the peer VTEP and the source VTEP the network switch is to:
compare the export RT in the loop detect packet with each of a plurality of import RTs associated with a corresponding VLAN configured in the peer VTEP; and
in response to a match between the export RT in the loop detect packet with one of the plurality of import RTs, identify that the VXLAN tunnel is configured between the peer VTEP and the source VTEP.

4. The network switch of claim 1, wherein the loop detect packet comprises overlay information encoded based on type-length-value encoding, the overlay information including VNI of the source VTEP, VLAN ID of the VLAN mapped to the VNI, the IP address of the source VTEP, the import Route Target (RT) and the export RT of the VLAN.

5. The network switch of claim 1, wherein in response to determining that the network loop is present, the network switch is to generate a notification indicating loop detection to a network administrator.

6. The network switch of claim 1, wherein in response to determining that the network loop is present, the network switch is to disable its access port configured in the VLAN mapped to the VNI.

7. The network switch of claim 1, wherein the network loop has a first portion in the VXLAN overlay of the DCN and a second portion in layer 2 of the access network.

8. The network switch of claim 1, wherein the network switch is to prevent broadcast storm of packets in the network, in response to determination of the network loop.

9. A method comprising:
receiving, by a network switch, a loop detect packet from an access network, wherein the access network is to connect customers to a data center network (DCN), and wherein the DCN includes a Border Gateway Protocol (BGP)-Ethernet Virtual Private Network (EVPN) based VXLAN overlay and the network switch is configured as a VXLAN Tunnel Endpoint (VTEP) in the VXLAN overlay;
analyzing, by the network switch, the loop detect packet comprising a VXLAN Network Identifier (VNI) of a source VTEP from which the loop detect packet originated, a Virtual LAN Identifier (VLAN ID) of a VLAN mapped to the VNI, an Internet Protocol (IP) address of the source VTEP, an import Route Target (RT) and an export RT of the VLAN indicating routes to be imported into and exported from a Virtual Routing and Forwarding (VRF) table of the VLAN, wherein analyzing the loop detect packet comprises:
comparing the VNI of the source VTEP with a locally configured VNI of the network switch;
in response to a match between the VNI of the source VTEP with the locally configured VNI, determining that the network switch is configured as a peer VTEP of the source VTEP;
comparing the import RT in the loop detect packet with an export RT of the peer VTEP and the export RT in the loop detect packet with an import RT of the peer VTEP;
determining, based on the comparison, whether a VXLAN tunnel is configured between the peer VTEP and the source VTEP; and
in response to determining that the VXLAN tunnel is configured, determining, by the network switch, that a network loop is present in the VLAN mapped to the VNI.

10. The method of claim 9, wherein determining whether the VXLAN tunnel is configured between the peer VTEP and the source VTEP comprises:
comparing the import RT in the loop detect packet with each of a plurality of export RTs associated with a corresponding VLAN configured in the peer VTEP; and
in response to a match between the import RT in the loop detect packet with one of the plurality of export RTs, identifying that the VXLAN tunnel is configured between the peer VTEP and the source VTEP.

11. The method of claim 9, wherein determining whether the VXLAN tunnel is configured between the peer VTEP and the source VTEP comprises:
comparing the export RT in the loop detect packet with each of a plurality of import RTs associated with a corresponding VLAN configured in the peer VTEP; and
in response to a match between the export RT in the loop detect packet with one of the plurality of import RTs, identifying that the VXLAN tunnel is configured between the peer VTEP and the source VTEP.

12. The method of claim 9, wherein the loop detect packet comprises overlay information encoded based on type-length-value encoding, the overlay information including VNI of the source VTEP, VLAN ID of the VLAN mapped to the VNI, the IP address of the source VTEP, the import Route Target (RT) and the export RT of the VLAN.

13. The method of claim 9, wherein in response to determining that the network loop is present, the method further comprises generating a notification indicating loop detection to a network administrator.

14. The method of claim 9, wherein in response to determining that the network loop is present, the method comprises disabling an access port of the network switch configured in the VLAN mapped to the VNI.

15. The method of claim 9, wherein the network loop has a first portion in the VXLAN overlay of the DCN and a second portion in layer 2 of the access network.

16. The method of claim 9, further comprising prevent broadcast storm of packets in the network, in response to determination of the network loop.

17. A non-transitory, computer readable medium including instructions that, when executed by a processor, cause a network switch to:
receive a loop detect packet from an access network, wherein the access network is to connect customers to a data center network (DCN), and wherein the DCN includes a Border Gateway Protocol (BGP)-Ethernet Virtual Private Network (EVPN) based VXLAN overlay and the network switch is configured as a VXLAN Tunnel Endpoint (VTEP) in the VXLAN overlay;
analyze the loop detect packet comprising a VXLAN Network Identifier (VNI) of a source VTEP from which the loop detect packet originated, a Virtual LAN Identifier (VLAN ID) of a VLAN mapped to the VNI, an Internet Protocol (IP) address of the source VTEP, an import Route Target (RT) and an export RT of the VLAN indicating routes to be imported into and exported from a Virtual Routing and Forwarding (VRF) table of the VLAN, wherein to analyze the loop detect packet, the network switch is to:
compare the VNI of the source VTEP with a locally configured VNI of the network switch;
in response to a match between the VNI of the source VTEP with the locally configured VNI, determine that the network switch is configured as a peer VTEP of the source VTEP;
compare the import RT in the loop detect packet with an export RT of the peer VTEP and the export RT in the loop detect packet with an import RT of the peer VTEP;
determine, based on the comparison, whether a VXLAN tunnel is configured between the peer VTEP and the source VTEP; and in response to determining that the VXLAN tunnel is configured, determine that a network loop is present in the VLAN mapped to the VNI.

18. The non-transitory computer-readable medium of claim 17, further comprising instructions that, when executed by the processor, cause the network switch to:
compare the import RT in the loop detect packet with each of a plurality of export RTs associated with a corresponding VLAN configured in the peer VTEP; and
in response to a match between the import RT in the loop detect packet with one of the plurality of export RTs, identify that the VXLAN tunnel is configured between the peer VTEP and the source VTEP.

19. The non-transitory computer-readable medium of claim 17, further comprising instructions that, when executed by the processor, cause the network switch to:
compare the export RT in the loop detect packet with each of a plurality of import RTs associated with a corresponding VLAN configured in the peer VTEP; and
in response to a match between the export RT in the loop detect packet with one of the plurality of import RTs, identify that the VXLAN tunnel is configured between the peer VTEP and the source VTEP.

20. The non-transitory computer-readable medium of claim 17, wherein the loop detect packet comprises overlay information encoded based on type-length-value encoding, the overlay information including VNI of the source VTEP, VLAN ID of the VLAN mapped to the VNI, the IP address of the source VTEP, the import Route Target (RT) and the export RT of the VLAN.

* * * * *